(12) United States Patent
Loew et al.

(10) Patent No.: US 10,256,555 B2
(45) Date of Patent: Apr. 9, 2019

(54) ELECTRICAL DISTRIBUTION CENTER WITH TERMINAL STABILIZING TERMINAL POSITION ASSURANCE MEMBER

(71) Applicant: Delphi Electrical Centers (Shanghai) Co., Ltd., Shanghai (CN)

(72) Inventors: Michael F. Loew, El Paso, TX (US); Haifei Guan, Shanghai (CN); Ai Hua Gong, Shanghai (CN)

(73) Assignee: Delphi Electrical Centers (Shanghai) Co., LTD (CN)

( * ) Notice: Subject to any disclaimer, the term of this patent is extended or adjusted under 35 U.S.C. 154(b) by 0 days.

(21) Appl. No.: 16/062,398

(22) PCT Filed: Nov. 22, 2016

(86) PCT No.: PCT/CN2016/106734
§ 371 (c)(1),
(2) Date: Jun. 14, 2018

(87) PCT Pub. No.: WO2017/101639
PCT Pub. Date: Jun. 22, 2017

(65) Prior Publication Data
US 2018/0358724 A1    Dec. 13, 2018

(30) Foreign Application Priority Data

Dec. 18, 2015   (CN) .......................... 2015 1 0957810

(51) Int. Cl.
*H01R 12/00*    (2006.01)
*H01R 12/70*    (2011.01)
(Continued)

(52) U.S. Cl.
CPC ..... *H01R 12/7052* (2013.01); *B60R 16/0238* (2013.01); *B60R 16/0239* (2013.01);
(Continued)

(58) Field of Classification Search
CPC .............. H01R 12/7052; H01R 12/716; H01R 13/506; H01R 2201/26; H02B 1/46; B60R 16/0238; B60R 16/0239
(Continued)

(56) References Cited

U.S. PATENT DOCUMENTS 4,255,004 A  *  3/1981  Kourimsky ............ H01R 31/02
                                                                439/65
7,931,479 B1 *  4/2011  De La Reza ....... B60R 16/0238
                                                              439/76.2
(Continued)

FOREIGN PATENT DOCUMENTS

CN         2562426 Y       7/2003
CN       203775565 U       8/2014
(Continued)

*Primary Examiner* — Khiem Nguyen
(74) *Attorney, Agent, or Firm* — Robert J. Myers

(57) ABSTRACT

An electrical distribution center includes a housing, an electronic device, an upper fixing member, a printed circuit board (PCB), a lower fixing member and a connector. The upper fixing member has a first inserting hole. Pin terminals of the electronic device pass through the first inserting hole and are connected to the PCB. A connector mounting slot for fixing the connector is arranged on the lower fixing member. A second inserting hole and a guide rod member are arranged in the connector mounting slot. A TPA member is sheathed on the guide rod member. The TPA member has a third inserting hole. Pin terminals of the connector pass through the third inserting hole and the second inserting hole and are fixed in the connector mounting slot with the TPA member. The pin terminals of the connector are connected to the PCB after passing through the first inserting hole.

10 Claims, 4 Drawing Sheets

(51) Int. Cl.
*H01R 12/71* (2011.01)
*H02B 1/46* (2006.01)
*B60R 16/023* (2006.01)
*H01R 13/506* (2006.01)

(52) U.S. Cl.
CPC ......... *H01R 12/716* (2013.01); *H01R 13/506* (2013.01); *H02B 1/46* (2013.01); *H01R 2201/26* (2013.01)

(58) Field of Classification Search
USPC ........................................ 439/76.2, 152, 157
See application file for complete search history.

(56) References Cited

U.S. PATENT DOCUMENTS

| 8,907,213 | B2* | 12/2014 | I | B60R 16/0238 174/50 |
|---|---|---|---|---|
| 2012/0199373 | A1 | 8/2012 | Uchida et al. | |
| 2015/0016077 | A1 | 1/2015 | Borowicz et al. | |

FOREIGN PATENT DOCUMENTS

| CN | 104299867 A | 1/2015 |
|---|---|---|
| CN | 205303799 U | 6/2016 |

* cited by examiner

ELECTRICAL DISTRIBUTION CENTER WITH TERMINAL STABILIZING TERMINAL POSITION ASSURANCE MEMBER

CROSS-REFERENCE TO RELATED APPLICATIONS

This application is a national stage application under 35 U.S.C. § 371 of PCT Application Number PCT/CN16/106734 having an international filing date of November, 2016, which designated the United States, the entire disclosure of which is hereby incorporated herein by reference.

TECHNICAL FIELD OF THE INVENTION

The present invention relates to an electrical distribution center, and more particularly to an electrical distribution center having a terminal stabilizing terminal position assurance member.

BACKGROUND OF THE INVENTION

In the design process of the vehicle's electrical/electronic distribution system, the electrical distribution center is the central control box for electric and electronic technology in modern automobiles. As the distribution center of electrical energy in the automotive electrical system, the current distribution in each circuit is rationally achieved in the automotive electronics. As an information processing center, the electrical distribution center receives the status signals of each electronic device and sends a control signal to respond accordingly.

Due to the rapid development of the automotive market, customers are increasingly demanding the ease of installation of electrical distribution centers and the precision of mounting dimensions. The existing electrical distribution center standards are liable to cause poor positional deviations during the installation and operation of the assembly and during transportation. A new and higher specification structure for ensuring the terminal position is the trend for the development of the electrical distribution center in the future.

SUMMARY OF THE INVENTION

The purpose of the present invention is to provide an electrical distribution center that stabilizes the terminal position degree in order to overcome the deficiencies of the prior art mentioned above and to ensure that the position of the internal terminal of the electrical distribution center does not change, effectively preventing the occurrence of damage during the installation operation and the transportation process. The terminal is misaligned due to misalignment of the terminals, which has the advantages of high mounting accuracy, simple structure, easy operation, and production cost.

The purpose of the present invention can be achieved by the following technical solutions:

An electrical distribution center with a terminal stabilizing terminal position assurance (TPA) member includes a housing, and an electronic device, an upper fixing member, a printed circuit board, a lower fixing member, and a connector sequentially arranged in the housing from top to bottom. The upper fixing member is provided with a first insertion hole. The pin terminal of the electronic device is connected to the printed circuit board after passing through the first insertion hole. A connector mounting slot for fixing the connector is arranged on the lower fixing member. The connector installation slot is provided with the first a second insertion hole and a guiding member. The guiding member is sleeved with a terminal position assurance (TPA) member. The TPA member is provided with a third insertion hole opposite to the second insertion hole, and the connector pin. After the terminal is sequentially passed through the third and the second insertion holes, the TPA member is fixed along the guide rod member in the connector installation slot, and the pin terminal of the connector passes through the first insertion hole and then connects the printed circuit board.

The connector mounting groove is further provided with a pre-locking rod member. The fixed end of the pre-locking rod member is disposed in the connector mounting groove. The free end of the pre-locking rod member is provided with a terminal stabilizing TPA member to limit the position of the guide rod. Raised position on the piece.

The shell includes a box cover and a bracket arranged vertically. The box cover is provided with a rotating shaft and a pull rod connecting the rotating shaft. The pull rod is provided with a hook portion, and the bracket is provided with a convex shaft opposite to the hook portion. The lever is rotated so that the hook catches the hook, The hook portion includes an upwardly curved first track and a downwardly curved second track. The first track is bent upwards to communicate with the second track, and the second track is bent downward to form an opening.

The pull rod is in a semi-frame shape and is arranged along the outer wall of the cover. Both ends of the pull rod are respectively rotationally connected with a rotating shaft. Two ends of the pull rod are respectively provided with a hook portion.

The connector mounting groove is provided in plurality.

The lower fixing member is also provided with a printed circuit board mounting slot for fixing the printed circuit board.

The upper fixing member and the lower fixing member are mutually locked.

The lower fixing member and the connector are engaged with each other.

The bracket is provided with an elastic clip for clamping the engine compartment of the automobile.

Compared with the prior art, the present invention has the following advantages:

1) In the present invention, a TPA member for guiding the position of the terminal and a corresponding guide member are provided. When the connector is installed, the pin terminal of the connector passes through the third insertion hole and the second insertion hole in sequence, and then the position stability is stable. The piece is fixed along the guide bar member in the connector installation slot, which can effectively ensure the precision of the paired installation operation. After the connector is fixed, the connector terminal is simultaneously fixed by the first insertion hole and the second insertion hole, which can effectively prevent the terminal position from shifting during the transportation process, so as to improve the precision of the position of the terminals in the electrical distribution center and adapt to the trend of future customer demands.

2) In the present invention, the electronic device, the upper fixing member, the printed circuit board, the lower fixing member and the connector are distributedly assembled. The printed circuit board mounting slot fixes the position of the printed circuit board, and the assembly is convenient and easy to disassemble and maintain.

3) In the present invention, the housing uses a box cover and a bracket which are interlocked with each other. In particular, this connection method adopts a hooking part and a convex shaft to clamp the connection. The first track and the second track on the hook part are defined to move the convex shaft. The track and the connection method can ensure the stable connection between the box cover and the bracket. The draw bar is in a semi-frame shape, which is convenient for the operator to operate and the design is more humane.

4) The connector mounting groove is also provided with a pre-locking member, which can limit the TPA member on the guide member, prevent the TPA member from falling off, and the structure is more stable and reliable.

5) A plurality of connector installation slots are provided, corresponding to which a plurality of connectors can be provided, and a large number of wiring harnesses can be connected to the circuit on the printed circuit board through connectors, which is suitable for producing multifunctional electrical distribution centers.

Figure 1:
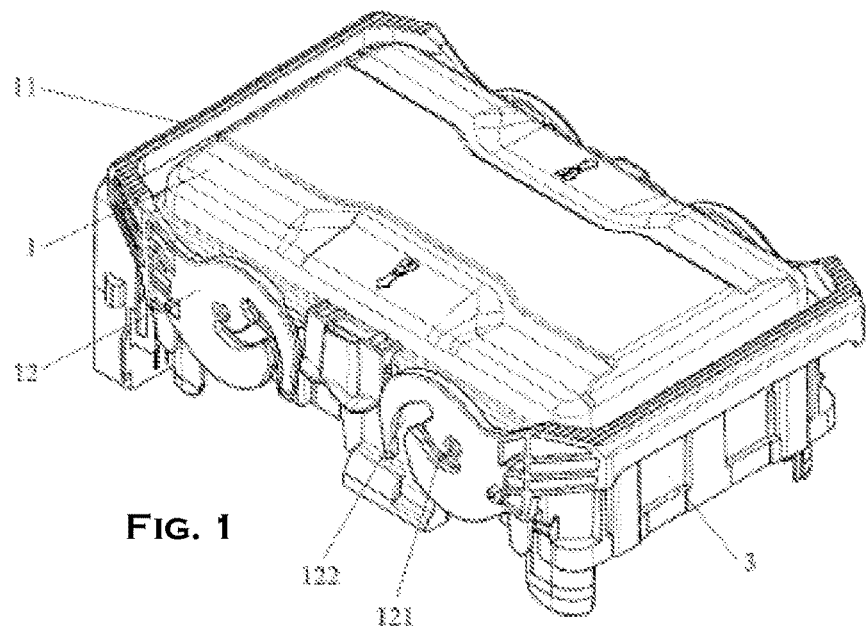
FIG. 1 is a schematic diagram of the external structure of the present invention.

LISTING OF THE REFERENCE NUMBERS IN THE DRAWINGS 1 cover,
11 pull rod;
12 hook portion;
121 first track;
122 second track;
2 electronic device;
3 upper fixing member;
4 printed circuit board;
5 lower fixing member;
51 connector mounting groove;
52 second insertion hole;
53 guiding member;
54 pre-locking rod member;
55 protrusion;
6 connector;
7 TPA member
71 third insertion hole;
8 bracket; and
81 convex shaft.

DETAILED DESCRIPTION OF THE INVENTION

The present invention will be described in detail below with reference to the accompanying drawings and specific embodiments.

This embodiment is implemented on the premise of the technical solution of the present invention, and a detailed implementation manner and a specific operation process are given. However, the scope of protection of the present invention is not limited to the following embodiments.

Figure 2:
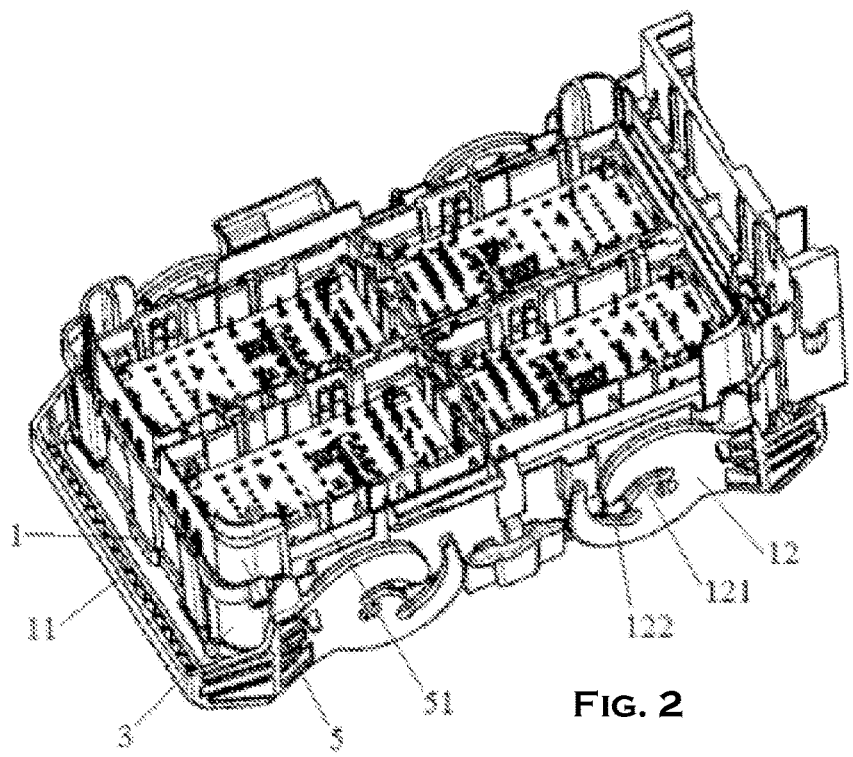
FIG. 2 is a schematic diagram of the internal structure of the present invention.
Figure 3:
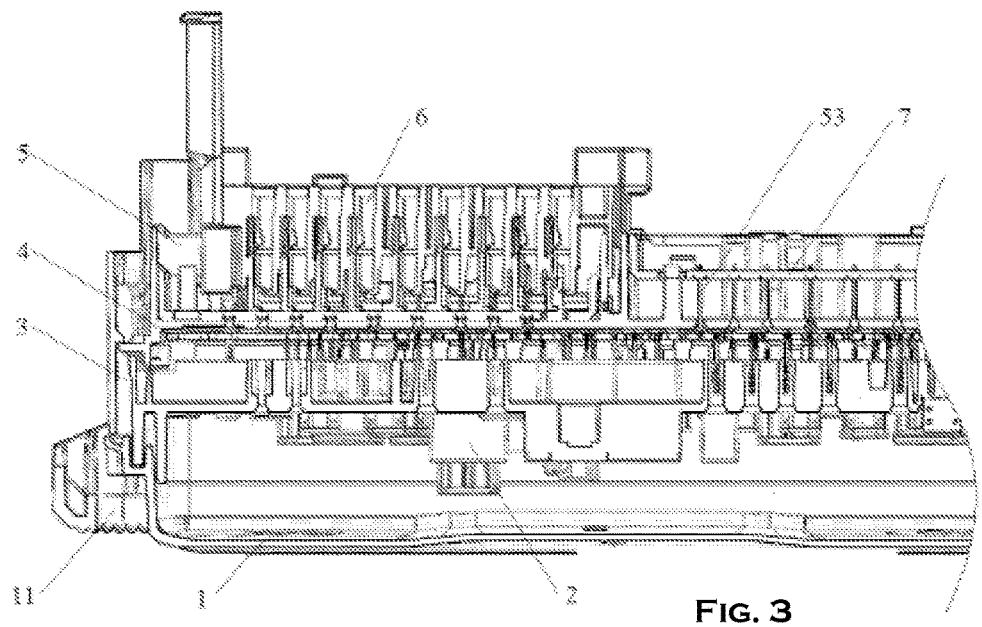
FIG. 3 is a schematic view of an internal cross section of the present invention.
Figure 4:
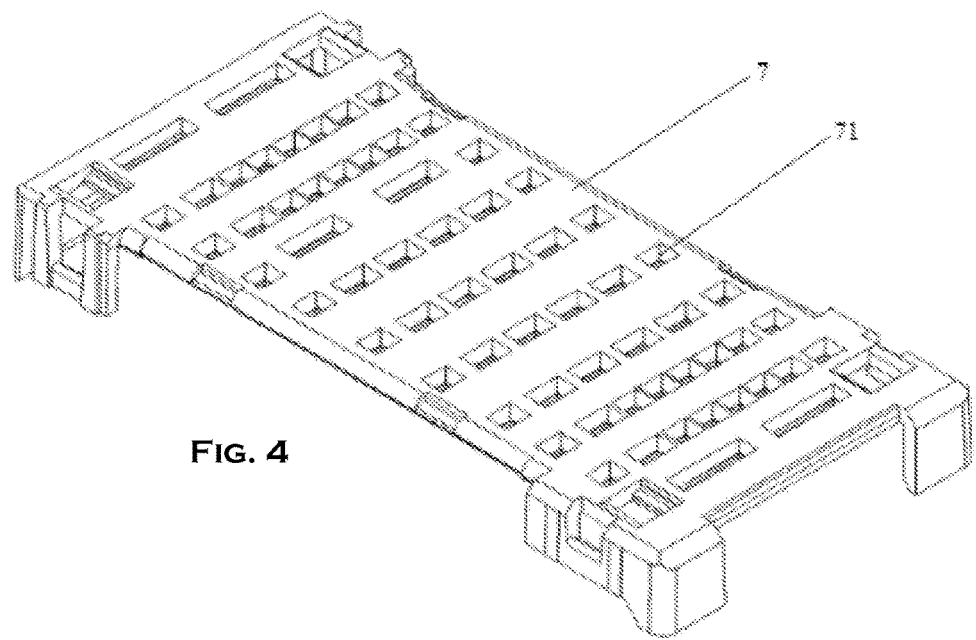
FIG. 4 is a schematic structural diagram of a TPA member.
Figure 5:
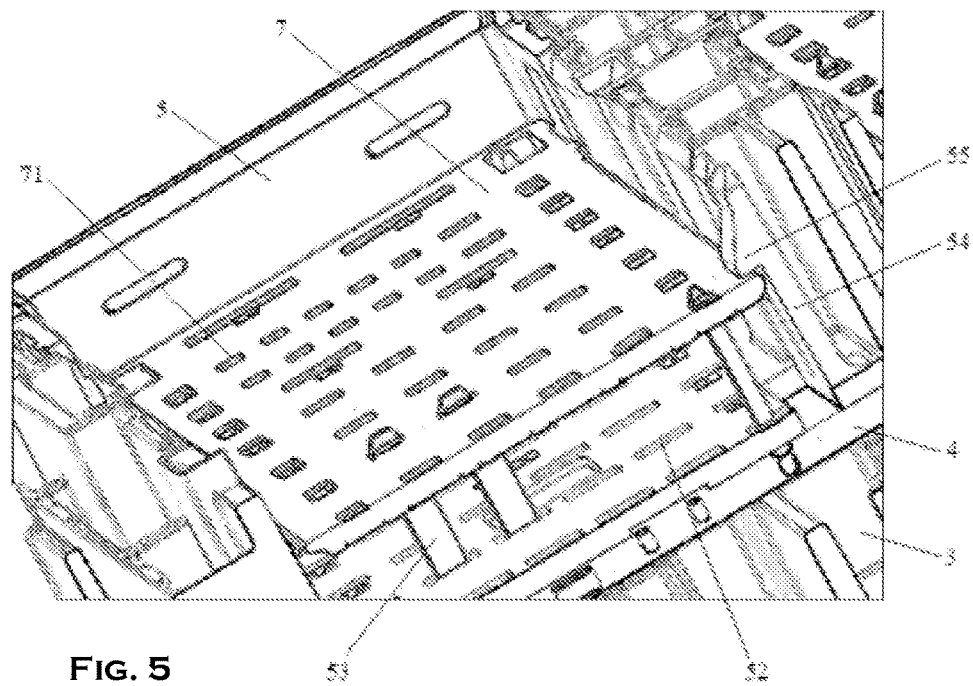
FIG. 5 is a schematic view of installation of a TPA member in a connector mounting groove of a lower fixing member.

As shown in FIG. 1, FIG. 2, and FIG. 3, an electrical distribution center for stabilizing the terminal position includes a housing, an electronic device 2, an upper fixing member 3, a printed circuit board 4, and a lower fixing, which are sequentially disposed in the housing from top to bottom. The lower fixing member 5 and the connector 6 and the upper fixing member 3 and the lower fixing member 5 are engaged with each other. The lower fixing member 5 and the connector 6 are mutually interlocked. The upper fixing member 3 is provided with a first insertion hole, the pin of the electronic device 2. The terminal is connected to the printed circuit board 4 after passing through the first insertion hole. The lower fixing member 5 is provided with a printed circuit board mounting slot for fixing the printed circuit board 4 and a connector mounting groove 51 for fixing the connector 6. The second insertion hole 52 and the guiding member 53, the guiding member 53 is provided with a TPA member 7 as shown in FIG. 4 and FIG. 5. The TPA member 7 is provided with a guiding member 53 opposite to the second insertion hole 52. The three insertion holes 71, the pin terminals of the connector 6 pass through the third insertion hole 71 and the second insertion hole 52 sequentially, and are fixed along the guiding member 53 along the guiding member 53 in the connector mounting groove 51. The pin terminal of the connector 6 is connected to the printed circuit board 4 after passing through the first insertion hole.

Figure 6:
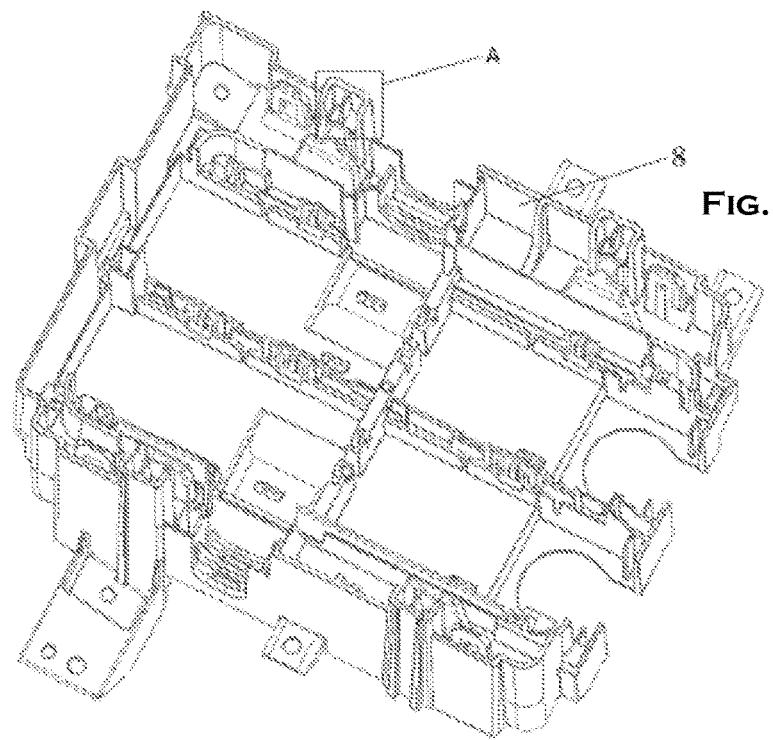
FIG. 6 is a schematic structural view of the bracket.
Figure 7:
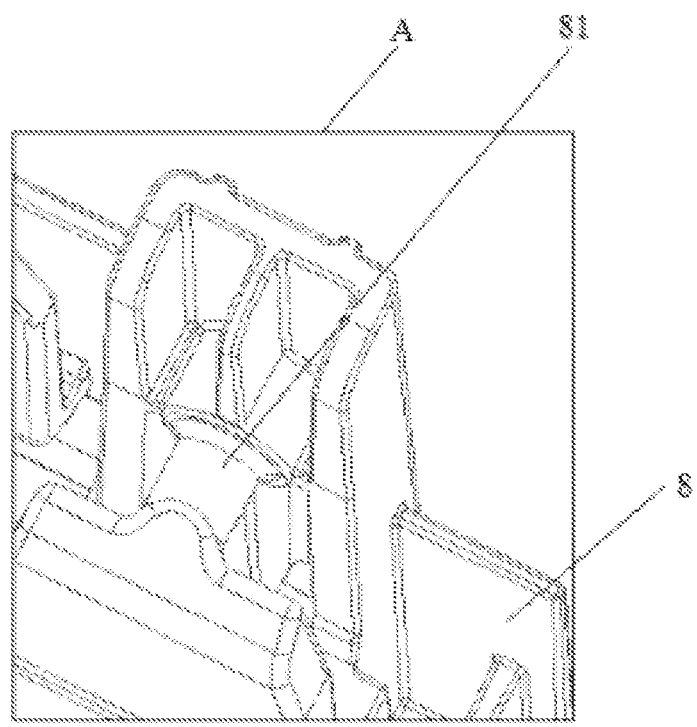
FIG. 7 is a partial enlarged view of A in FIG. 6.

As shown in FIG. 1 and FIG. 6, the housing includes a cover 1 and a bracket 8 disposed up and down. The cover 1 is provided with a rotating shaft and a pull rod 11 for connecting the rotating shaft. The pull rod 11 is provided with a hook portion 12, and the bracket 8 is provided thereon. The convex shaft 81 facing the hook portion 12 rotates the pull rod 11 so that the hook portion 12 is engaged with the convex shaft 81.

The hook portion 12 includes an upwardly curved first track 121 and a downwardly curved second track 122. The first track 121 is bent upwards to communicate with the second track 122. The second track 122 is bent downward to form an opening.

In the present embodiment, two half-frame-shaped pull rods 11 are used and are disposed along the outer wall of the cover 1, and the rotation axis and the convex axis are four. Each of the pull rods 11 is rotatably connected to two ends of the pull rod 11 respectively. A hook portion 12 is respectively provided at both ends of the pull rod 11 and the pull rod 11 can be grasped by both hands and lifted upwards. At this time, the hook portion 12 is downward, and the opening contacts the convex shaft 81 on the bracket 8, and the convex shaft 81 follows The opening enters the second track 122, and then the pull rod 11 is pressed down, so that the convex shaft 81 enters the first track 121 from the second track 122 to complete the snap connection.

As shown in FIG. 5, the connector mounting groove 51 is further provided with a pre-locking rod member 54. The fixed end of the pre-locking rod member 54 is disposed in the connector mounting groove 51, and the free end of the pre-locking rod member 54 is configured to define the protrusion 55 of the TPA member 7 at the position of the guiding member 53.

A plurality of connector mounting grooves 51 are provided.

In this embodiment, four connector mounting grooves 51 are uniformly arranged, and four connectors 6 can be installed correspondingly.

The bracket 8 is provided with an elastic clip for clamping within the engine compartment of the automobile, which facilitates installation of the electrical distribution center in the engine compartment of the vehicle.

The electrical distribution center assembly process is as follows:

Step 1: the cover 1, the electronic device 2, the upper fixing member 3, the printed circuit board 4, and the lower fixing member 5 are sequentially assembled, and the printed circuit board 4 is connected to the power line;

Step 2: The TPA member 7 is set on the guiding member 53 of the connector mounting groove 51, and the position of the TPA member 7 is defined by the pre-locking rod member 54. At this time, the TPA member 7 and the connector mounting groove 51 The distance between the bottom surface is 8 to 10 mm, for example 9 mm, this distance forms the space for stabilizing the terminal position of the connector 6 when the connector 6 is installed;

Step 3: The terminal of the connector 6 is inserted into the third insertion hole 71, and the TPA member 7 is pushed down until the connector 6 is engaged with the lower fixing member 5. At this time, the TPA member 7 is tightly attached to the connector. The bottom of the connector mounting groove 51, the terminal of the connector 6 through the second insertion hole 52 opposite the third insertion hole to the 71 is connected printed circuit board mounting groove;

Step 4: The connector 6 is connected to the wire harness, the bracket 8 is in contact with the cover 1 from the side of the connector 6, the bracket 8 is provided with a wire harness port for harness wire access, and the pull rod 11 causes the bracket 8 and the cover 1 to be snapped to complete the assembly.

The working principle of the electrical distribution center: the printed circuit board 4 has a circuit etched, and the electronic device 2 includes a fuse, a relay, etc. The printed circuit board 4 connects the power line to the fuse, the relay, and the connector 6 and the connector 6 to the inside of the car through the wiring harness. Power is supplied to the components to achieve a reasonable distribution of currents in the various circuits.

The invention claimed is:

1. An electrical distribution center configured to stabilize a position of a terminal, comprising:
   a housing containing an electronic device, an upper fixing member, and a printed circuit board, which are sequentially arranged in the housing in the order listed;
   a lower fixing member;
   a connector, wherein the upper fixing member is provided with a first insertion hole, and a pin terminal of the electronic device passes through the first insertion hole and connects the printed circuit board, said printed circuit board provided with a connector mounting groove for fixing the connector on the lower fixing member, wherein a second insertion hole is provided in the connector mounting groove, and
   a guiding member having a TPA member sleeved thereon, wherein the TPA member is provided with the second insertion hole opposite to the guiding member and a third insertion hole opposite the second insertion hole, wherein the pin terminal of the connector passes through the third insertion hole and the second insertion hole in sequence, and is guided along with the TPA member, said guiding member is fixed in the connector mounting groove, and wherein the pin terminal of the connector passes through the first insertion hole and then connects the printed circuit board.

2. The electrical distribution center according to claim 1, wherein a pre-locking rod member is further provided in the connector mounting groove, wherein a fixed end of the lower fixing member is provided in the connector mounting groove, and wherein a free end of the pre-locking rod member is provided with a protrusion for limiting a position of the TPA member on the guiding member.

3. The electrical distribution center according to claim 1, wherein the housing comprises a cover and a bracket, wherein the cover is provided with a rotating shaft and a pull rod for connecting the rotating shaft, wherein a hook portion is arranged on the pull rod, and wherein a convex shaft opposite to the hook portion is provided on the bracket for rotation, said pull rod causes the hook portion to be engaged with the convex shaft.

4. The electrical distribution center according to claim 3, wherein the hook portion comprises a first track bent upwards and a second track bent downwards, wherein the first track is bent upwards to communicate with the second track, and wherein the second track is bent downward to form an opening.

5. The electrical distribution center according to claim 3, wherein the pull rod is in a semi-frame shape and is arranged along an outer wall of the cover and wherein the rotating shaft is rotatably connected with a shaft, and two hook portions are respectively disposed at both ends of the pull rod.

6. The electrical distribution center according to claim 1, wherein said connector mounting groove is provided in plurality.

7. The electrical distribution center according to claim 1, wherein the lower fixing member is further provided with a printed circuit board mounting slot for fixing the printed circuit board.

8. The electrical distribution center according to claim 1, wherein the upper fixing member and the lower fixing member are engaged with each other.

9. The electrical distribution center according to claim 1, wherein the lower fixing member and the connector are connected to each other.

10. The electrical distribution center according to claim 3, wherein the bracket is provided with an elastic clip for clamping the electrical distribution center within an engine compartment of an automobile.

\* \* \* \* \*